F. B. CARLISLE.
TIRE VALVE.
APPLICATION FILED OCT. 31, 1910.
991,949. Patented May 9, 1911.
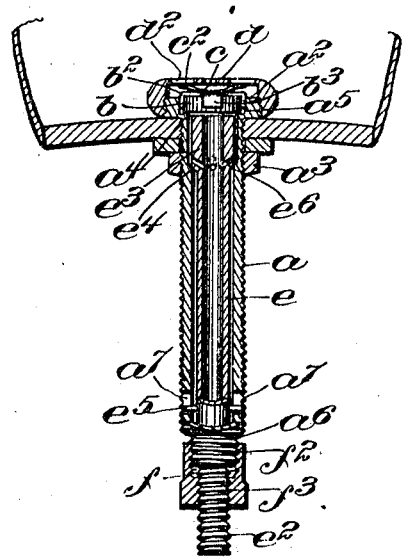
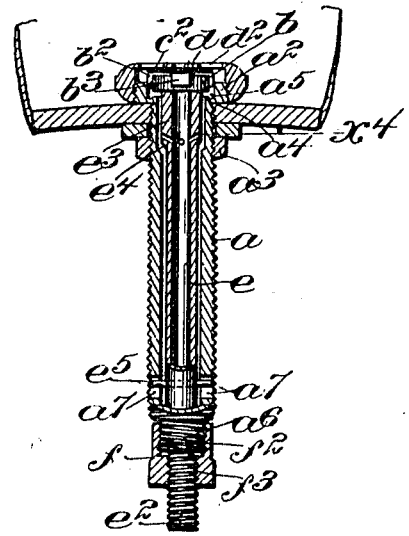
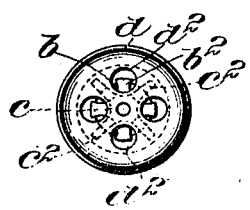
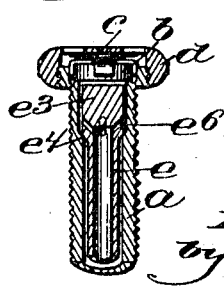
Inventor:
Fred B. Carlisle,

UNITED STATES PATENT OFFICE.

FRED B. CARLISLE, OF MALDEN, MASSACHUSETTS, ASSIGNOR TO STANDARD AUTO VALVE COMPANY, OF BOSTON, MASSACHUSETTS, A CORPORATION OF MASSACHUSETTS.

TIRE-VALVE.

991,949.  Specification of Letters Patent.  Patented May 9, 1911.

Application filed October 31, 1910. Serial No. 589,857.

*To all whom it may concern:*

Be it known that I, FRED B. CARLISLE, a citizen of the United States, residing in Malden, in the county of Middlesex and State of Massachusetts, have invented an Improvement in Tire-Valves, of which the following description, in connection with the accompanying drawings, is a specification, like letters on the drawings representing like parts.

The present invention relates to a valve for pneumatic tires, the purpose of the invention being to simplify the construction and to increase the capacity of the inflating passage without detriment to the holding capacity of the valve, provision being also made for deflating, and mechanically holding the valve open during deflation, at the same time affording a relatively large passage for the outflowing air.

In accordance with the invention, the valve is provided with a main outer tube or casing adapted to be clamped in the tire in the usual way, the said casing constituting a guide member for a concentric inner tubular portion which, in the construction shown, constitutes the initial passage for the ingress and egress of the air. The valve, however, is arranged to close the entire outer tube or guide way, when seated, the said tube being provided at its inner end within the tire with a valve seat, so that apart from the advantage of readily deflating the tire, the outer tube or casing and the valve coöperating therewith constitute a practical tire valve. The valve itself constitutes a disk of rubber or other suitable material adapted to engage the seat at the inner end of the tube or casing and close the entire orifice. Under normal conditions the concentric inner tube portion above described is slightly separated from the valve, so that air entering the main tube will act on nearly the entire area of the valve disk, the pressure of the inflowing air, therefore, acting on an area only slightly smaller than the area exposed to the back pressure tending to close the valve. By this construction, moreover, the valve, which normally operates as a check valve, can be positively moved away from its seat by a longitudinal movement of the inner tube with relation to the outer tube, or guide, and the two tubes are provided, in accordance with the present invention, with right and left hand threads adapted to be operated upon by a single nut having corresponding threads in different locations, so that by turning the said nut the two tubes are given a relative longitudinal movement and are locked in any desired position.

Figure 1 is a vertical section of a valve embodying the invention, shown as applied to a tire; Fig. 2 is a similar view showing the valve mechanically opened for the purpose of deflating the tire; Fig. 3 is a plan view of the end of the valve which is contained in the tire; Fig. 4 is a horizontal section, on a line $x^4$ of Fig. 2; and Fig. 5 is a partial view of a valve detached from the tire showing a slight modification.

The valve embodying the invention consists of a tube $a$ provided at one end with a flange $a^2$ adapted to engage the inner surface of a tire or inner tube, and with an external thread adapted to take the clamping nut $a^3$ at the outside of the tire and the ordinary dust cap which is not herein shown.

The dimensions of the tube and the thread may be the same as those of the Schrader valve now commonly used, so that the valves embodying the invention can be used in any tire in which the Schrader valves are now employed.

The tube $a$ is provided at the end within the flange $a^2$ with an annular valve seat $a^4$ to coöperate with the valve $b$ which is shown as consisting of a disk of rubber slightly greater in area than the area of the opening through the main tube, the difference in area being only sufficient to afford a tight seat for the valve without making any material difference between the area acted upon by pressure from the outside and that acted on from the inside. By this construction it will be seen that while the valve is tight when seated, it is easily unseated by the incoming pressure, a very slight movement of the valve, moreover, affording a relatively large space for the incoming air, so that the inflation of the tire is rendered relatively easy. In the construction shown, the valve $b$ is provided with a reinforcing piece $b^2$ shown as a metal spider fitting over the top of the disk and having down turned wings $b^3$ which fit within a recess $a^5$ formed in the flange $a^2$ around the valve seat, and thereby guide and position the valve. The valve is normally held seated by means of a light spring $c$ which is shown as a flat plate of metal having fingers $c^2$ which bear against an inclosing case $d$ adapted to be screwed on the outside of the flange $a^2$ and being provided with holes or openings $d^2$ through which the air passes into the tire.

It is obvious from the above description that this construction alone constitutes an efficient and practicable tire valve, there being, however, no means for readily deflating the tire except by the insertion of some tool or the like in the tube to press the valve off its seat.

In order to provide the valve with means for readily deflating the tire, the main tube $a$ is provided with an inner concentric tube $e$ provided at its outer end with a screw thread $e^2$ to take the ordinary valve cover or a pump nipple. The said tube has an enlarged inner portion $e^3$, shown as provided with an inclined annular shoulder $e^4$ adapted to seat against a corresponding shoulder within the tube $a$, these two shoulders being normally drawn together when the valve is in use, as shown in Fig. 1, the inner tube being of such length as to be wholly disengaged from the valve $b$ when in this position. It is obvious, therefore, that air entering the tube $e$ will flow into the space behind the valve $d$ and unseat the same, thereby entering the tire. Furthermore, if the inner tube $e$ is moved longitudinally inward it will engage and unseat the valve $b$, as shown in Fig. 2, thus allowing the air in the tire to flow freely into the main tube, so that it can escape through the space between the said tubes.

When the valve is in its normal position for inflation, as shown in Fig. 1, the shoulder $e^4$ and the corresponding shoulder within the tube $a$ constitute a limiting stop to hold the parts firmly in position, and also constitute a valve to close the space between the inflating tube and the tubular casing, so that the air pumped into the inflating tube cannot blow back through the space between said inflating tube and the casing.

In order to produce a positive movement of the tube $e$ with relation to the outer tube $a$, an actuating nut $f$ is employed, the said nut having at one end an internal thread $f^2$, and at the other end an internal thread $f^3$, the said threads being cut in opposite directions and adapted to coöperate with the thread $e^2$ on the inner tube and a thread $a^6$ on the outer tube. The inner tube $e$ is prevented from turning by means of a projecting member or members $e^5$ engaging in slots $a^7$ in the outer tube, so that by turning the nut $f$ the inner tube is positively moved longitudinally and will be held in any position in which it is left. To deflate the tire, therefore, it is necessary only to rotate the nut $f$, thus moving the inner tube $e$ until the valve $b$ has been unseated, after which the air will flow freely out. It is practicable, and in some cases desirable, to close the inner end of the tube $e$ and to provide said tube with lateral ports $e^6$, so that the air flowing from said tube will reach the valve through the space around the closed inner end thereof. Such a construction is shown in Fig. 5, and the ports $e^6$ are also shown in the other drawings, although they may, of course, be dispensed with when the tube $e$ is open all the way through, since there is space enough between the two tubes to allow the air to escape from within when the valve is mechanically unseated.

What I claim is:

1. A valve consisting of a tubular casing having a flange at one end, said flange being provided with a recess or pocket, and with a valve seat at the end of the passage through the casing, combined with a valve member coöperating with said valve-seat, said valve member being contained in and guided by said pocket and an inflating tube independent of said valve member and said casing.

2. A tire valve consisting of a tubular casing provided at one end with an external valve seat; a flange surrounding said seat and being provided with a recess or pocket around the seat; a valve disk loosely fitting said pocket; a retaining cap secured to the flange to keep the valve in position; and an inflating tube within the casing independent of said valve.

3. A tire valve consisting of a tubular casing provided at one end with an external valve seat; a flange surrounding said seat and being provided with a recess or pocket around the seat; a valve disk loosely fitting said pocket; a retaining cap secured to the flange to keep the valve in position; a spring between said cap and the valve disk; and an inflating tube within the tubular casing independent of said valve, said tube being longitudinally movable for the purpose of mechanically unseating the valve.

4. A tubular tire valve consisting of a tubular casing provided at one end with an external valve seat surrounding the tubular opening; a portion extended beyond said valve seat to form a pocket or recess around said seat; a valve fitting in and guided by said recess and coöperating with said valve seat; means for yieldingly pressing said valve toward said seat; an inflating tube independent of said valve and tubular casing; and means for closing communication between said inflating tube and said casing.

5. The combination with a tubular valve provided at one end with an external valve seat; of a portion projecting beyond said seat to form a recess or pocket; a disk valve provided with a reinforcing piece in the form of a spider having its ends turned parallel with the walls of the recess; a flat spring bearing upon said reinforcing piece; and means for holding said spring in position.

6. The combination with a tubular casing provided at one end with a valve seat; of a valve coöperating with said seat; means for yieldingly retaining said valve in proximity to said seat, said valve being adapted to be seated by back pressure; a longitudinally movable inflating tube located within said tubular casing, and adapted by its longitudinal movement to engage and unseat said valve for deflating purposes; and coöperating valve seats between said tubular casing and said inflating tube to close the annular space between said parts when the valve is in normal inflating position.

7. A valve comprising an outer tubular member provided at one end with an external valve seat; a valve coöperating with said seat; an inner tubular member normally out of engagement with said valve, said inner tubular member projecting beyond the outer member and being adapted to be coupled to a pump nipple for inflating purposes; and means for producing a longitudinal movement of said inner tubular member and retaining the said member in any position to which it has been moved.

8. In a tire valve, the combination with a tubular outer casing provided at one end with a flange to seat against the inner surface of the tire and a valve seat formed in said flange; a valve coöperating with said seat; a retaining cap for said valve secured to said flange; a longitudinally movable inner member provided with an inflating passage and provision for coupling a pump nipple; external screw threads on the outer casing and inner member, respectively, said threads being opposite in direction; and a nut having two threaded portions to coöperate with the threaded portions on the outer casing and the inner member, respectively, substantially as and for the purpose described.

In testimony whereof, I have signed my name to this specification in the presence of two subscribing witnesses.

FRED B. CARLISLE.

Witnesses:
 W. E. COVENEY,
 JAS. J. MALONEY.